United States Patent [19]

Senda et al.

[11] 4,430,450

[45] Feb. 7, 1984

[54] EXPANDABLE THERMOPLASTIC POLYMER PARTICLES AND PROCESS FOR PRODUCING THE SAME

[75] Inventors: Kenichi Senda, Akashi; Masao Nakagawa, Kobe, both of Japan

[73] Assignee: Kanegafuchi Kagaku Kogyo Kabushiki Kaisha, Osaka, Japan

[21] Appl. No.: 499,041

[22] Filed: May 27, 1983

[30] Foreign Application Priority Data

May 28, 1982 [JP] Japan .................................. 57-91898

[51] Int. Cl.³ ................................................ C08V 9/18
[52] U.S. Cl. ........................................ 521/60; 521/56; 521/57
[58] Field of Search ............................. 521/56, 60, 57

[56] References Cited

U.S. PATENT DOCUMENTS 4,017,427  4/1977  Granda et al. ......................... 521/60
4,036,794  7/1977  Keppler et al. ........................ 521/60

Primary Examiner—Morton Foelak
Attorney, Agent, or Firm—Sughrue, Mion, Zinn, Macpeak and Seas

[57] ABSTRACT

Disclosed are expandable thermoplastic polymer particles and process for preparing the same.

Expandable thermoplastic polymer particles superior in processability as well as expansion are prepared by controlling an amount of inside moisture contained in said particles coated or impregnated with a blowing agent to not more than 1% by weight based on polymer, immediately after prepared.

1 Claim, No Drawings

EXPANDABLE THERMOPLASTIC POLYMER PARTICLES AND PROCESS FOR PRODUCING THE SAME

BACKGROUND OF THE INVENTION

1. Field of the invention

The present invention relates to expandable thermoplastic polymer particles having superior processability as well as expansion and process for producing the same. More particularly, it relates to expandable thermoplastic polymer particles superior in processability and expansion in which polymers obtained by emulsion polymerization, in particular, are pelletized by an extruder and the resultant pellets are coated or impregnated with a volatile blowing agent in an aqueous suspension medium.

2. Description of the prior art

As expandable synthetic polymer particles, expandable styrene-series polymer particles are widely known, which are usually produced by suspension polymerization. In the process, polymerization and impregnation of polymer particles with a blowing agent can be performed continuously and it is therefore very effective, but particle size distribution of polymer particles obtained is not only broader than desired, but undesired particles are contained in greater amounts. Moreover, in suspension polymerization it is difficult or impossible to polymerize alpha-alkyl styrene such as alpha-methyl styrene or to copolymerize it with styrene since reactivity or copolymerizability of alpha-alkyl styrene is low specifically in a system of suspension polymerization. This problem can be solved by the adoption of emulsion polymerization. That is, polymer latex is obtained by emulsion polymerization, then subjected to coagulation, heat-treatment and drying to thus obtain polymer powder. The resulting polymer powder is pelletized by the use of an extruder to thereby produce pellets of a desired particle size. The size of the pellets so obtained is controlled to be a desired particle size by the adjustment of pelletizing conditions including the diameter of a dice and cutting. In addition, the particle size distribution is by far narrower than that of particles prepared by suspension polymerization. The pellets prepared by an extrusion are coated or impregnated with a blowing agent in an aqueous medium to thus provide expandable synthetic polymer particles.

Notwithstanding, the expandable particles of synthetic resin prepared by emulsion polymerization, pelletization and impregnation of a blowing agent markedly decrease in processability as well as expansion with the time when those are left to stand, to such an extent that those can not be supplied to the practical use in a relatively short period.

SUMMARY OF THE INVENTION

It is therefore an object of the present invention to provide expandable thermoplastic polymer particles superior in processability as well as expansion, having no such problems as stated above.

It is another object of the present invention to provide a process for producing expandable thermoplastic polymer particles superior in processability and expansion.

These and other objects of the present invention together with the advantage thereof will become apparent to those skilled in the art from the detailed disclosure of the present invention as set forth hereinbelow.

The present invention has been completed through a series of study on the discovery that the foregoing drawbacks are caused by intrusion of moisture as a suspension medium together with a blowing agent into the pellets and release of moisture contained in the open air while those are allowed to stand. That is, it has been found out that expandable thermoplastic polymer particles having superior expansion and processability are obtained by controlling an amount of moisture, immediately after prepared, contained in the pellets in which a blowing agent is contained, to 1% by weight or less, more preferably 0.7% by weight or less.

Expandable thermoplastic polymer particles with the content of moisture in an amount not more than 1% by weight are obtained when a water-soluble inorganic salt is added in conjunction with a suspending agent to an aqueous suspension medium at the time of coating or impregnating of the blowing agent. The water-soluble inorganic salt may include calcium chloride, sodium sulfate, magnesium chloride, sodium chloride and the like. Those are used singly or in combination of two or more. The water-soluble inorganic salt is added in a range of from 3 to 20 parts by weight based on 100 parts by weight of an aqueous suspension medium such as water. In case of less than 3 parts by weight, moisture is not reduced, inversely in case of more than 20 parts by weight, an effect of reducing moisture is not varied and thus not recommended.

Monomers used in emulsion polymerization of the present invention are not limited specifically, including such as styrene, alpha-methyl styrene, acrylonitrile, t-butyl styrene, methyl methacrylate, n-butyl acrylate, 2-ethylhexyl acrylate, ethyl acrylate.

When pellets extruded are coated or impregnated with a blowing agent in an aqueous suspension medium, a suspending agent is employed to prevent the pellets from agglomerating. As the suspending agent used in the present invention, any known suspending agent normally used in suspension polymerization may be employed. However, taking into consideration environmental regulation such as COD value in waste water, an inorganic suspending agent is preferred to use. As the inorganic suspending agent, there may be included tricalcium phosphate and it provides an outstanding effect when used in conjunction with an anion surface active agent in a small amount. The anion surface active agent in an amount of from 0.006 to 0.1% by weight to that of an aqueous suspension medium may give a satisfactory result. With an amount outside the foregoing range, suspension becomes to be unstable. Anion surface active agents are not specifically limited, including such as alkyl benzene sodium sulfonate, alpha-olefine sodium sulfonate and rosined soap. In such a case, a small amount of nonion surface active agents may further be added in conjunction therewith.

As a blowing agent, any known volatile blowing agent may be suitably used, including such as propane, butane, pentane, petroleum ether, trichloromonofluoromethane, dichlorodifluoromethane. Those are used singly or in combination of two or more. With a view to enhancing expansion of expandable polymer particles, those particles may further be coated or impregnated with a suitable solvent such as toluene, ethyl benzene and methylene chloride upon or before coating or impregnating of a blowing agent, without any adverse effect.

Hereinafter the present invention will be explained by way of examples that follow, to which the invention is in no way limited.

EXAMPLE 1

(1) Preparation of polymer

Following reactants were charged into a reactor equipped with a stirrer.

| | |
|---|---|
| Water | 250 Parts (by weight, the same applies hereinafter) |
| Sodium laurate | 3 Parts |
| Sodium formaldehyde sulfoxylate | 0.4 Part |
| Disodium ethylenediaminetetraacetate | 0.01 Part |
| Ferrous sulfate | 0.0025 Part |

After deoxidation, the reactor was heated up to 60° C. with stirring in a stream of nitrogen, then the polymerization was continued while adding dropwise continuously a monomeric mixture given in Table 1. After dropwise addition was completed, the reactor was further stirred at 60° C. to thus terminate the polymerization. The resulting polymer latex was coagulated with calcium chloride, then subjected to washing with water, filtration, drying and pelletizing. The obtained pellets were about 1 mm in diameter.

TABLE 1

| Components | Parts |
|---|---|
| Stylrene | 90 |
| Alpha-methyl styrene | 10 |
| Cumene hydroperoxide | 0.3 |
| t-dodecyl mercaptan | 0.1 |

(2) Preparation of expandable polymer particles

Into an autoclave equipped with a stirrer, the following reactants were charged.

| | |
|---|---|
| Water | 100 Parts |
| Pellets | 100 Parts |
| Tricalcium phosphate | 0.5 Part |
| Alpha-olefine sodium sulfonate | 0.025 Part |
| Water-soluble inorganic salt | As set forth in Table 2 |
| Toluene | 1.0 Part |

After the inside atmosphere of the autoclave was replaced with nitrogen, the autoclave was elevated to 90° C. and stirred for 2 hours. Then, 9 parts of butane was charged under pressure and the autoclave was elevated to 110° C. and maintained for 6 hours. Thereafter, the autoclave was cooled to 40° C., dehydrated, and dried to thereby obtain expandable polymer particles.

TABLE 2

| Experiment No. | Inorganic salts | Parts |
|---|---|---|
| A-1 | Calcium chloride | 4.0 |
| A-2 | " | 7.0 |
| A-3 | " | 15.0 |
| A-4 | Sodium sulfate | 7.0 |
| A-5 | Magnesium chloride | 7.0 |
| A-6 | Sodium chloride | 10.0 |

The inside moisture contained in the expandable polymer particles A—1 to A—6 obtained above was measured immediately after prepared and a week thereafter. The obtained results were tabulated in Table 3.

TABLE 3

| Experiment No. | Immediately after* preparation | A week after* preparation |
|---|---|---|
| A-1 | 0.76 | 0.56 |
| A-2 | 0.51 | 0.48 |
| A-3 | 0.49 | 0.41 |
| A-4 | 0.56 | 0.50 |
| A-5 | 0.60 | 0.52 |
| A-6 | 0.49 | 0.40 |

*In the above table, moisture is represented by parts by weight based on polymer.

Next, expandable polymer particles A—1 to A—6 were expanded with vapor respectively, and satisfactory expansion was obtained. Moreover the particles A—1 to A—6 were pre-expanded to have 40 times the apparent volume of the original and the pre-expanded particles were allowed to stand for 24 hours, then molded using a molding machine "PEARL STAR" manufactured by TOYO MACHINERY AND METAL CO., LTD. A mold for molding a sheet of 300 mm×200 mm×20 mm was employed. The obtained molded products were all superior in surface condition as well as inner bonding.

COMPARATIVE EXAMPLE 1

Expandable polymer particles B—1 to B—4 were prepared in similar procedures to those of Example 1, excepting that an amount of inorganic salts added were varied as set forth in Table 4.

TABLE 4

| Experiment No. | Inorganic salts | Parts |
|---|---|---|
| B-1 | None | — |
| B-2 | Calcium chloride | 1.0 |
| B-3 | Sodium sulfate | 1.0 |
| B-4 | Sodium chloride | 1.0 |

The expandable polymer particles so obtained were subjected to the measurement of inside moisture contained therein immediately after preparation and a week thereafter. The results were shown in Table 5.

TABLE 5

| Experiment No. | Immediately after* preparation | A week after* preparation |
|---|---|---|
| B-1 | 3.21 | 1.03 |
| B-2 | 1.23 | 0.65 |
| B-3 | 1.51 | 0.83 |
| B-4 | 1.72 | 0.95 |

*Moisture is represented by parts by weight based on polymer.

The obtained particles B—1 to B—4 were expanded with vapor but no satisfactory expansion was attained with a result that contracted hard particles were observed in some quantity. Further, the polymer particles B—1 to B—4 were pre-expanded to have 30 times the apparent volume of the original, the pre-expanded particles were allowed to stand for 24 hours, then molded in a similar fashion to that of Example 1. The resulting molded products possessed gaps between particles and were inferior in inner bonding, which were far from practical usefulness.

As apparent from comparing results between Examples and Comparative Examples, molded products superior in expansion and processability were obtained when expandable polymer particles prepared by the present invention were employed.

What we claim is:

1. In a process for producing expandable thermoplastic polymer particles, improvement which comprises pelletizing styrene polymer powder obtained by emulsion polymerization and coating or impregnating the resulting pellets with a volatile blowing agent in an aqueous suspension medium containing a suspending agent and a water-soluble inorganic salt selected from the group consisting of calcium chloride, sodium sulfate, magnesium chloride, sodium chloride and mixtures thereof, in a range of from 3 to 20 parts by weight based on 100 parts by weight of the aqueous suspension medium, whereby the amount of inside moisture contained in said particles immediately after preparation is not more than 1% based on the weight of the polymer particle.

* * * * *